Patented Feb. 15, 1949

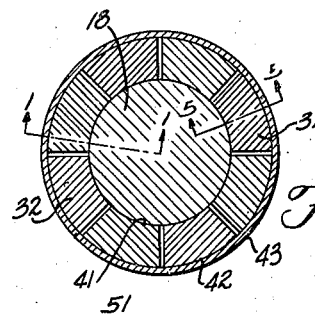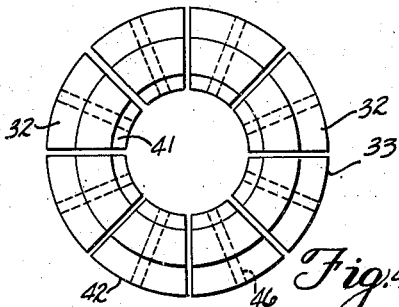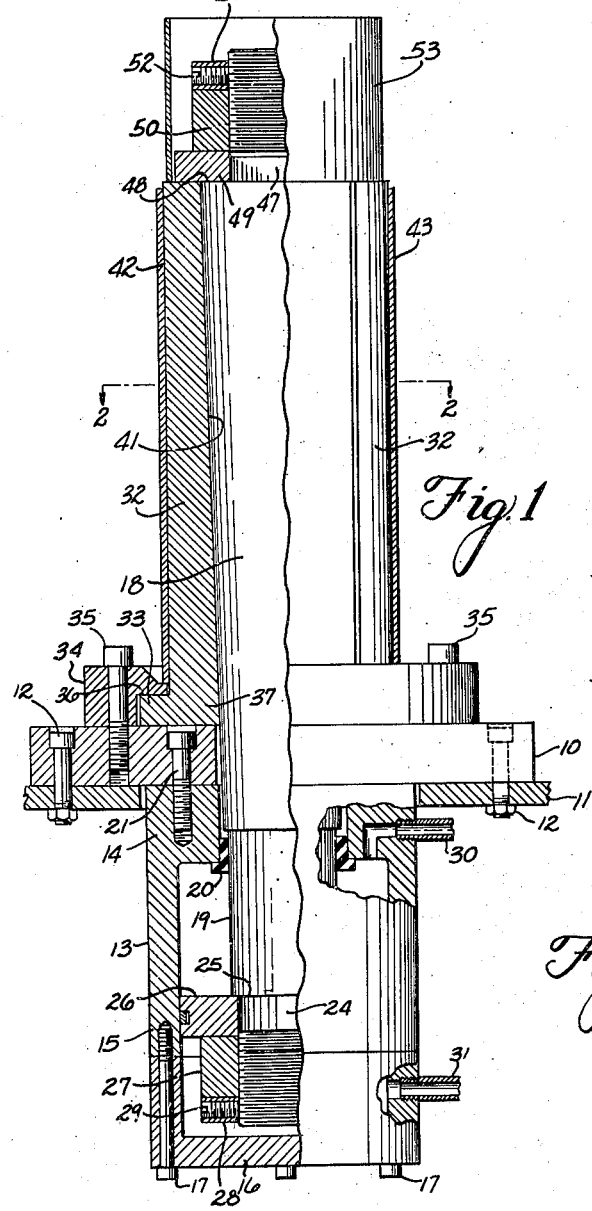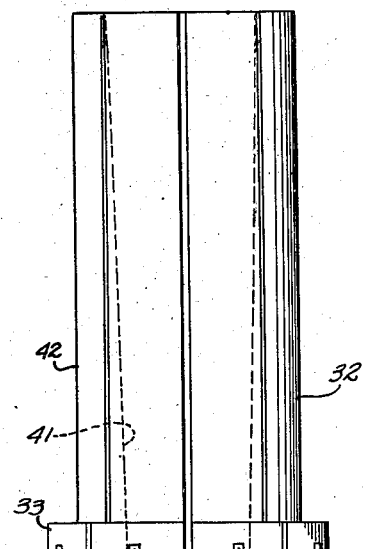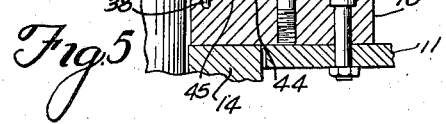

2,461,565

UNITED STATES PATENT OFFICE 2,461,565

METAL SLEEVE EXPANDING DEVICE WITH INTEGRAL WEDGE AND PISTON ROD

Wayne J. Morrill, Fort Wayne, Ind.

Application December 7, 1944, Serial No. 567,102

2 Claims. (Cl. 153—80)

My invention relates in general to expanding devices and more particularly to expanding devices adapted to expand and size sleeves and other annular members to close tolerances with respect to a predetermined dimensional standard, whereby the sleeves or other annular members may be made uniform to facilitate manufacturing production and ease of assembly of associated parts with which the sleeves or other annular members are to be combined.

In manufacturing processes, there are many applications for sleeves and other annular members to which associated parts must be mounted. If these sleeves or other annular members are not properly sized or made true, even to the extent of a few thousandths of an inch, great difficulty and inconvenience is the result. Production is slowed up and time in consumed in adjusting and gauging the trueness of the assembly to make certain that it will pass the required rigid inspection.

An object of my invention is the provision of an expanding device whereby sleeves or other annular members may be easily and readily sized to close tolerances with respect to a predetermined dimensional standard.

Another object of my invention is the provision of an expanding device whereby the sides of the expanding elements are maintained parallel with respect to each other while the expanding elements are moved outwardly in a radial direction to the expanded position.

Another object of my invention is the provision of an expanding device in which there is no external ram or plunger to interfere with the placing or mounting of the sleeves or other annular members over the expanding elements.

Another object of my invention is the provision of an expanding device in which the opposing forces between the expanding elements and the actuating means are taken up in a mounting plate which carries on one side thereof the expanding element and which carries on the other side thereof the actuating means.

Another object of my invention is the provision of an expanding device which may be adjustably set to expand the expanding elements to a predetermined dimensional radial movement.

Other objects and a fuller understanding of my invention may be had by referring to the following description and claims, taken in conjunction with the accompanying drawing, in which:

Figure 1 illustrates a side elevational view of a device embodying my invention with certain parts shown in cross-section taken along the line 1—1 of Figure 2, and with other parts broken away to more clearly illustrate the subject matter of the device;

Figure 2 is a cross-sectional view taken along the line 2—2 of Figure 1, showing only the parts which are cut;

Figure 3 shows a side elevational view of the expanding elements;

Figure 4 is a plan view of the expanding elements shown in Figure 3; and

Figure 5 is a fragmentary view similar to Figure 1, but taken along the line 5—5 of Figure 2.

With reference to the drawing, my invention comprises generally a mounting plate 10 having mounted on the upper side thereof the expanding elements and having mounted on the lower side thereof the fluid actuating means for operating the expanding elements. As illustrated, the mounting plate 10 may be mounted upon any suitable support table 11 by means of nuts and bolts 12. The fluid actuating means which is mounted to the underneath side of the mounting plate 10 may comprise a cylindrical body 13 having an upper end portion 14 and a lower end portion 15. Both end portions are open. The upper end portion 14 may be connected to the underneath side of the mounting plate 10 by means of cap screws 21 or any other suitable means. The lower end portion 15 of the cylindrical body 13 may be closed by a cylinder head 16 which is in the form of a cup having an internal side wall forming part of the cylindrical chamber. The cylinder head 16 may be connected to the lower end portion 15 of the cylindrical body 13 by means of the illustrated cap screws 17 or by any other suitable means.

A piston 26 is reciprocally mounted within the cylindrical body 13 and is arranged to actuate a tapering wedge member 18 which is surrounded by a plurality of segmental expanding elements 32. The lower end of the tapering wedge member 18 is provided with a shank portion 19 to which the piston 26 is connected. As illustrated, the shank portion 19 is provided with a reduced portion 24 thereby making a shoulder 25. The piston 26 is provided with an internal opening which closely fits around the reduced portion 24 and with the upper side thereof resting against the shoulder 25. A holding nut 27 is provided for securing the piston 26 upon the reduced portion 24 of the shank portion 19. The holding nut 27 is prevented from becoming loose by means of a lock nut 28 having a set screw 29 therein which engages the threads upon which the holding nut 27 is mounted. The upper end portion 14 of the cylindrical body is provided with a seal 20 which makes a good seal engagement with the shank portion 19 of the tapering wedge member 18. The flow of fluid to and from the cylindrical chamber above the piston 26 may be provided through a conduit 30 and the flow of the fluid to and from the cylindrical chamber below the piston 26 may be provided through a conduit 31. The valve for controlling the flow of fluid is not shown in the drawing but it is clearly understood that when pressure is applied to the upper side of the piston 26 the tapering wedge member 18 moves downwardly and when fluid pressure is applied to the underneath side of the piston 26 the tapering wedge member 18 moves upwardly.

In the drawing, I have illustrated eight segmental expanding elements 32 surrounding the tapering wedge member 18 although it is to be understood that any suitable number of segmental expanding elements may be employed. The segmental expanding elements 32 define substantially a cylindrical outer surface 42 and substantially a tapering inner annular surface 41 which closely matches the taper of the tapering wedge member 18. The sleeve which is being expanded and sized is indicated by the reference character 43. The base portion of the segmental elements is provided with a segmental flange 33 and when the segmental expanding elements 32 are mounted upon the mounting plate 10 the segmental flanges 33 define substantially an annular flange. As illustrated best in Figures 1 and 5, the segmental flanges 33 are held against the mounting plate 10 by a holding collar 34 having an internal annular shoulder 36 which slidably receives the segmental flanges 33. The annular holding collar 34 may be connected to the mounting plate by cap screws 35 or any other suitable means. The segmental expanding elements 32 are arranged to move in a radial direction upon the mounting plate 10. Any suitable means may be employed to insure that the segmental expanding elements 32 move in a radial direction, and as illustrated I employ radially disposed keys 44 which fit in radial slots 45 in the plate 10 and into radial slots 46 in the base 37 of the segmental elements, see Figure 5. The radially disposed keys 44 may be held in place by means of a pin 38 driven into the mounting plate 10. The upper end of the tapering wedge member 18 is provided with an extension portion 47 of a smaller diameter than the tapering wedge member to present a shoulder 48 against which a stop collar 49 is secured by means of a holding nut 50. As illustrated, the holding nut is prevented from turning by means of a lock nut 51 having a set screw 52 therein which is adapted to engage the threads upon which the holding nut is mounted. A protecting shield 53 may be positioned around the stop collar 49 for safety purposes.

In operation, the cylindrical sleeve 43 or any other annular sleeve is placed around the segmental expanding elements 32 when they are in a contracted position, that is the position when the piston 26 is in its uppermost location. Inasmuch as the tapering wedge member 18 is contained at all times within the segmental expanding elements 32, there is no outside interference to the placing of the cylindrical sleeve over the outside of the segmental expanding elements. To expand the cylindrical sleeve it is only necessary to apply pressure to the cylindrical chamber above the piston 26 for drawing the tapering wedge member 18 downwardly within the tapering inner annular surface provided by the segmental expanding element 32. As the tapering wedge member 18 is drawn downwardly, the segmental expanding element 32 moves radially outwardly for expanding and sizing the cylindrical sleeve. The sides of the cylindrical segmental expanding elements 32 are maintained parallel with respect to each other as they are moved radially outwardly during the expanding operation. This is because the tapering wedge member 18 and the tapering inner annular surface 41 of the segmental expanding elements complementarily and closely fit into each other. In the present drawing the taper is substantially three-fourths of an inch per one foot, although it is to be understood that any other suitable tapering angle may be employed. With the angle illustrated, the cohesion between the closely mating tapering surfaces when provided with a film of oil is sufficient to draw the segmental element radially inwardly upon movement of the tapering wedge member 18 in an upward direction. Accordingly, no external means need be employed to return the segmental expanding elements 32 to their contracted position as the tapering wedge member 18 is raised. The degree to which the sleeve 43 is expanded is determined by the setting of the stop collar 49, so that all sleeves or other annular members which are expanded are sized to a uniform predetermined dimensional standard.

In my invention there are no external rams or actuating plungers which must be raised out of the way before the expanded and sized sleeves may be removed and before another sleeve may be mounted over the outside of the segmental expanding element 32. In other words, in my invention the tapering wedge member 18 is contained within the segmental expanding elements and the opposing forces or reaction between the fluid actuated device and the segmental expanding elements is taken up by the mounting plates 10 and accordingly there is no need for an external mounting to take care of the opposing forces as would be the case with an externally mounted ram or actuating plunger.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. An expanding device comprising, a mounting plate having a first and a second side with an opening therethrough, said mounting plate having a plurality of raised guide keys on the first side thereof and extending radially outwardly about said opening, a cylinder adapted to be fastened to the second side of said mounting plate, said cylinder having a first end and a second end, said first end having an opening therein aligned with the opening in the mounting plate, removable closure means for closing the second end of the cylinder, a tapering wedge member having a first end portion and a second end portion, said first end portion having a diameter less than the diameter of the opening in the mounting plate, and said second end portion having a diameter greater than the diameter of the opening in the mounting plate, said wedge member also having a shank portion integral therewith on said first end portion with the diameter of the shank portion less than the diameter of the first end portion, said first end portion and the integral shank portion insertable in said cylinder through the aligned openings in the mounting plate and in the first end of the cylinder, a piston insertable in the second end of the cylinder, threaded means insertable in the second end of the cylinder and engaging the shank portion to hold the piston on the said shank portion of the tapering wedge member, seal means between the wall of the opening in the first end of the cylinder and the shank portion, a plurality of segmental expanding elements defining substantially an inner annular tapering surface surrounding said tapering wedge member and being slidable in a radial direction on said plate, each of said segmental expanding elements having a groove therein to cooperate with a respective guide key, a collar having an annular shoulder slidably receiving said substantially annular flange and holding the segmental expanding elements on the first side of said plate, said segmental expanding elements terminating at a spaced distance from said plate, said tapering wedge member having an extended portion projecting beyond the terminating ends of the segmental expanding elements, and threadably adjustable stop means carried by the extended portion of the tapering wedge member and adapted to abut the terminating ends of the segmental expanding elements to limit expanding movement thereof.

2. In an expanding device, a mounting plate having a first and a second side with an opening therethrough, a clyinder fastened to the second side of said mounting plate and having a first end and a second end, said first end having an opening therein aligned with the opening in the mounting plate, removable closure means for closing the second end of the cylinder, a tapering wedge member having a first end portion and a second end portion, said first end portion having a diameter less than the diameter of the opening in the mounting plate, and said second end portion having a diameter greater than the diameter of the opening in the mounting plate, said wedge member also having a shank portion integral therewith on said first end portion with the diameter of the shank portion less than the diameter of the first end portion, said first end portion and the integral shank portion insertable in said cylinder through the aligned openings in the mounting plate and in the first end of the cylinder, a piston insertable in the second end of the cylinder, threaded means insertable in the second end of the cylinder and engaging the shank portion to hold the piston on the said shank portion of the tapering wedge member, a plurality of segmental expanding elements defining substantially an inner annular tapering surface surrounding said tapering wedge member and being slidable in a radial direction on the first side of said plate, each of said segmental expanding elements having a segmental flange engaging the first side of the mounting plate, and a collar fastened to the first side of said mounting plate and having an annular shoulder slidably engaging the segmental flanges to hold them against the first side of the mounting plate and thereby hold the segmental expanding elements in alignment with the tapering wedge member.

WAYNE J. MORRILL.

REFERENCES CITED

The following references are of record in the file of this patent:

UNITED STATES PATENTS

| Number | Name | Date |
|---|---|---|
| 183,241 | Work | Oct. 10, 1876 |
| 516,180 | Bernhardt | Mar. 13, 1894 |
| 888,239 | Kelly | May 19, 1908 |
| 907,396 | Passat | Dec. 22, 1908 |
| 1,022,720 | Buckley | Apr. 9, 1912 |
| 1,039,948 | Hunter | Oct. 1, 1912 |
| 1,105,094 | Mowat | July 28, 1914 |
| 1,389,036 | Edwards | Aug. 30, 1921 |
| 1,524,106 | Riegel | Jan. 27, 1925 |
| 1,656,149 | Hopkins | Jan. 10, 1928 |
| 1,689,468 | Wilcox | Oct. 30, 1928 |
| 1,934,411 | Dahlman | Nov. 7, 1933 |
| 2,319,216 | Dewald | May 18, 1943 |